May 26, 1925.
E. A. RATHBUN
VEHICLE TOP
Filed Aug. 15, 1921
1,539,209
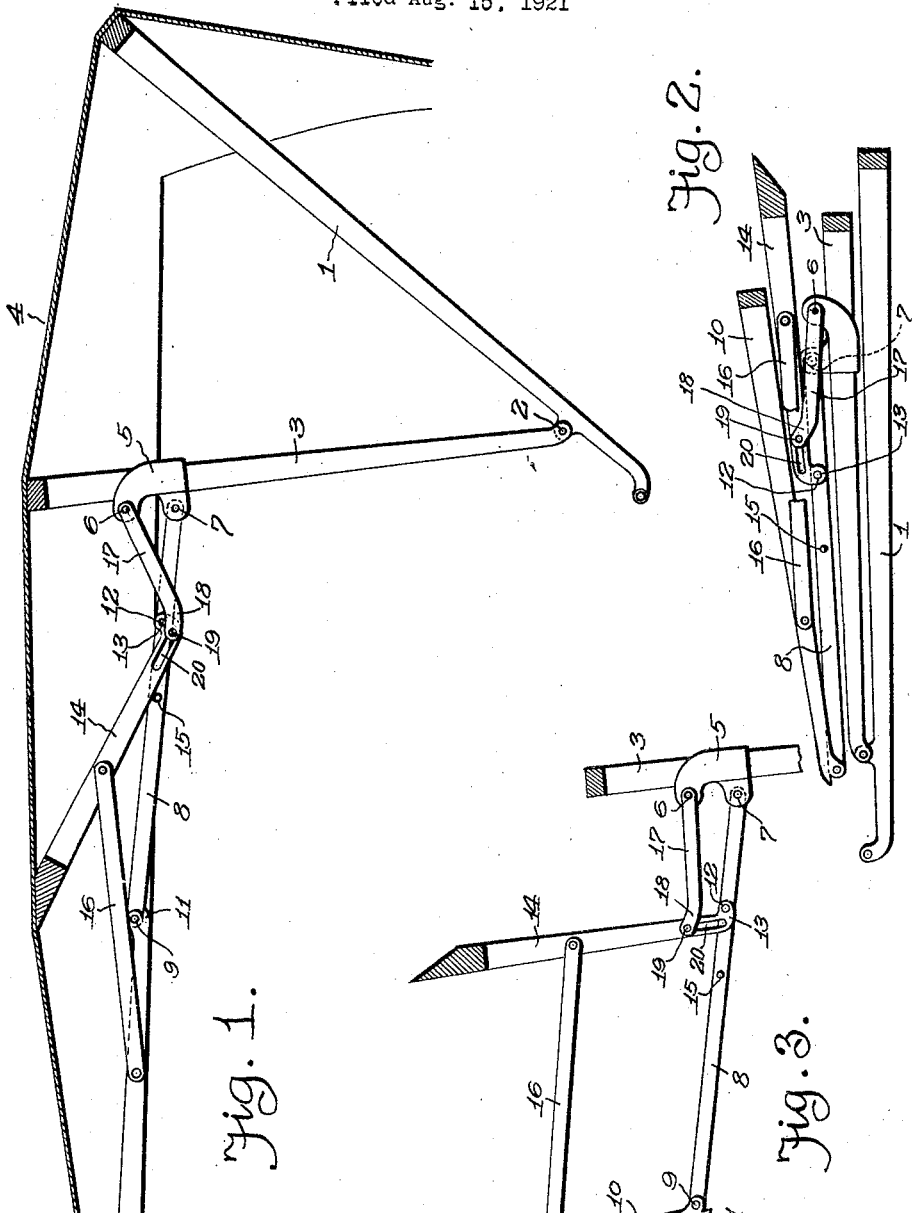
Inventor
Edgar A. Rathbun,
By
Attorneys Patented May 26, 1925.

1,539,209

UNITED STATES PATENT OFFICE.

EDGAR A. RATHBUN, OF PONTIAC, MICHIGAN, ASSIGNOR TO AMERICAN FORGING AND SOCKET COMPANY, OF PONTIAC, MICHIGAN, A CORPORATION OF MICHIGAN.

VEHICLE TOP.

Application filed August 15, 1921. Serial No. 492,357.

*To all whom it may concern:*

Be it known that I, EDGAR A. RATHBUN, a citizen of the United States of America, residing at Pontiac, in the county of Oakland and State of Michigan, have invented certain new and useful Improvements in Vehicle Tops, of which the following is a specification, reference being had therein to the accompanying drawings.

This invention relates to vehicle tops and has special reference to the bows, bow sockets, arms, links, and special hardware which will provide a foldable or collapsible frame work for supporting a canopy or cover.

My invention aims to provide a vehicle top frame work that may be easily and quickly manipulated either to extend or collapse the frame work, and this operation can be performed by one person without any danger of the fingers being pinched, without the parts of the frame work binding or sticking, and without any danger of the cover being torn or unduly worn. The various parts of the frame work are articulated and proportioned so that manipulation of the outrigger of the frame work causes other bows and parts to automatically assume positions which render folding or collapsible frame work comparatively easy. The method of connecting the various bows and parts also insures a rigid frame work when in a set up or extended position.

The construction entering into the top frame work will be hereinafter described and then claimed, and reference will now be had to the drawing wherein—

Figure 1 is a longitudinal sectional view of the vehicle top frame work in a setup or extended position;

Fig. 2 is a similar view showing a frame work folded or collapsed; and

Fig. 3 is a similar view of a portion of the top frame work showing the relation of parts as the frame work is either raised or lowered.

The vehicle top frame work is applicable to automobile bodies of various designs and the greater part of the frame work is adapted to be supported from the rear portion of an automobile body, by side irons, back stays, or the like, while the forward end of the frame work may be supported from a wind shield by props or the like.

The vehicle top frame work includes a rearwardly inclined bow 1 and pivotally connected to said bow, as at 2, is a front bow 3 adapted to co-operate with the bow 1 in supporting the rear portion of a cover or canopy 4.

Suitably connected to the side portions of the front bow 3 are pieces of hardware 5, and since the side constructions of the frame work are identical, I deem it only necessary to specifically describe one side of the frame work, and later consider the operation of raising and lowering the bows of the framework.

Each piece of hardware 5 has forwardly extending superposed apertured lugs 6 and 7 and pivotally connected to the lug 7 is an arm 8 adapted to swing downwardly into parallelism with the side portion of the front bow 3. Pivotally connected to the outer end of the arm 8, as at 9, is a side portion of an outrigger bow 10 to which may be suitably connected the front end of the cover 4. The side portion of the outrigger bow 10 has a rearwardly extending stop 11 at the pivotal connection 9 to engage the arm 8 and limit the opening movement of the outrigger bow relative to said arm; the pivotal connection 9 being somewhat similar to a rule or one-way joint.

Pivotally connected to the inner side of the arm 8 by a pivot pin 12 or the like, is the curved or hook-shaped end 13 of an intermediate bow 14 and the side portion of said intermediate bow is adapted to engage and rest on a stop pin 15 carried by and projecting inwardly from the arm 8, said stop pin co-operating with the pivot pin 12 in supporting the intermediate bow 14 at an acute angle relative to the forward end of the arm 8.

The side portions of the intermediate bow 14 are pivotally connected by links 16 to the side portions of the outrigger bow 10 and the link 16 is adapted to co-operate with the stop 11 in limiting the opening movement of the outrigger bow 10 relative to the intermediate bow, said link having its forward pivoted end in advance of the pivotal connection 9 with the greater part of the link in a plane above said pivotal connection.

Pivotally connected to the lug 6 of the piece of hardware 5 is a link 17 having a lower curved end 18 provided with an outwardly extending pin 19 slidable in a longitudinal slot 20 in the intermediate bow 14, at the curved end 13 thereof, and the inner end of the slot 20 may have a notch to receive the pin 19 and prevent accidental shifting of the pin in the slot 20 because of any vibrations of the top frame work.

Considering Fig. 1, showing the top frame work in a set up position, it will be noted that the pin 19 is in a plane below the pivot pin 12 and in advance thereof, consequently the downward movement of the arm 8 will be limited until the intermediate bow 14 is raised and swung on the pivot pin 12. In other words, considering the pivot pin 12 relative to the piece of hardware 5, it swings in an arc different from the path traveled by the pin 19, and the length of the slot 20 is such as to permit of the link 17 and the arm 8 swinging downwardly towards the front bow 3. This can only be accomplished by shifting the intermediate bow 14 upwardly, and by reference to Fig. 3, it will be noted that the outrigger bow 10 must be raised to shift the intermediate bow 14. As this is accomplished the pin 19 rides upwardly in the slot 20 until the pin reaches the upper end of the slot, at which time the arm 8 may be lowered towards the lower portion of the bow 3 with the intermediate bow 14 and the outrigger bow 10 assuming positions superposed relative to the front bow 3.

After raising the bows 1 and 3, the outrigger bow 10 can be manipulated to cause the intermediate bow 14, the links 16 and 17, and the arms 8 to assume a set-up or extended position, and the whole forward part of the top frame work has a trussed and braced support from the front bow 3, which will co-operate with the wind-shield, props or the like, in properly supporting the cover 4 relative to an automobile body.

What I claim is:—

1. A vehicle top framework comprising a bow, an outrigger bow, arms connecting said outrigger bow to said front bow, an intermediate bow pivotally connected to said arms and having a portion thereof below said arms, supporting means on said arms adapted to hold said intermediate bow at an inclination to said arms, and links connecting the portion of said intermediate bow below said side arms to said front bow above said side arms for holding said intermediate bow on said supporting means to cooperate therewith in supporting said arms relative to said front bow, said links causing synchronous movement of said bows.

2. In a top for vehicles and the like, the combination of a support pivotally attached to the body of the vehicle, a forwardly extending auxiliary bow pivotally attached to said support and adapted to fold thereagainst; a supplemental bow pivotally attached to said auxiliary bow; and a link connected at its one end with said support at a point above the point of attachment of said auxiliary bow thereto and at its other end with said supplemental bow, the point of pivotal connection of the latter with said auxiliary bow lying slightly above a line joining the ends of said link in the open position of the top.

In testimony whereof I affix my signature in presence of two witnesses.

EDGAR A. RATHBUN.

Witnesses:
 ANNA M. DORR,
 KARL H. BUTLER.